(12) United States Patent
Martinchek et al.

(10) Patent No.: US 8,317,907 B2
(45) Date of Patent: Nov. 27, 2012

(54) WATER VAPOR TRANSFER ASSEMBLY

(75) Inventors: David A. Martinchek, Spencerport, NY (US); Ian R. Jermy, Leroy, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 378 days.

(21) Appl. No.: 12/796,320

(22) Filed: Jun. 8, 2010

(65) Prior Publication Data

US 2011/0297261 A1 Dec. 8, 2011

(51) Int. Cl.
*B01D 53/22* (2006.01)
*H01M 8/06* (2006.01)

(52) U.S. Cl. ............... 96/7; 95/52; 429/413; 429/414

(58) Field of Classification Search .......... 96/4, 7; 95/45, 52; 55/502; 429/413, 414; 137/594
See application file for complete search history.

(56) References Cited

U.S. PATENT DOCUMENTS

| | | | | |
|---|---|---|---|---|
| 3,735,559 A | * | 5/1973 | Salemme | 95/52 |
| 4,110,220 A | * | 8/1978 | Lavender | 210/321.75 |
| 5,382,478 A | * | 1/1995 | Chow et al. | 429/414 |
| 5,965,288 A | * | 10/1999 | Okamoto | 429/413 |
| 6,171,374 B1 | * | 1/2001 | Barton et al. | 96/7 |
| 7,258,329 B2 | * | 8/2007 | Sasamoto | 261/104 |
| 7,435,284 B2 | * | 10/2008 | Piccinini et al. | 95/52 |
| 7,585,355 B2 | * | 9/2009 | Gonjo et al. | 96/9 |
| 7,846,591 B2 | * | 12/2010 | Gu et al. | 429/414 |
| 2005/0053815 A1 | * | 3/2005 | Yang et al. | 429/24 |
| 2009/0092863 A1 | | 4/2009 | Skala | |

* cited by examiner

*Primary Examiner* — Jason M Greene
(74) *Attorney, Agent, or Firm* — Fraser Clemens Martin & Miller LLC; J. Douglas Miller

(57) ABSTRACT

A water vapor transfer assembly for a fuel cell system includes at least one water vapor transfer device. The water vapor transfer device permits a transfer of water from a wet stream to a dry stream. The water vapor transfer device is disposed between a pair of end plates. The end plates each have a plurality of outwardly extending ribs. The water vapor transfer device and the end plates are disposed within a housing having a pair of wet stream apertures and a pair of dry stream apertures formed therein. The housing further includes a plurality of channels formed adjacent the dry stream apertures. The channels are in fluid communication with the wet stream apertures. The outwardly extending ribs of the end plates cooperate with the channels to define a tortuous bypass flow path between the wet stream apertures of the housing.

20 Claims, 5 Drawing Sheets

WATER VAPOR TRANSFER ASSEMBLY

FIELD OF THE INVENTION

The present disclosure relates to a water vapor transfer device and more particularly to a water vapor transfer assembly for use in a fuel cell system.

BACKGROUND OF THE INVENTION

A fuel cell system is increasingly being used as a power source in a wide variety of applications. The fuel cell system has been proposed for use in vehicles as a replacement for internal combustion engines, for example. The fuel cell system may also be used as a stationary electric power plant in buildings and residences, portable power in video cameras, computers, and the like. Typically, the fuel cell system includes a plurality of fuel cells arranged in a fuel cell stack to generate electricity, which is used to charge batteries or provide power to an electric motor.

A typical fuel cell is known as a polymer electrolyte membrane (PEM) fuel cell, which combines a fuel such as hydrogen and an oxidant such as oxygen to produce electricity and water. The oxygen is generally supplied by an air stream. In order to perform within a desired efficiency range, a sufficient humidification of the polymer electrolyte membranes of the fuel cell should be maintained. The sufficient humidification desirably extends the useful life of the electrolyte membranes in the fuel cell, as well as maintains the desired efficiency of operation.

As part of the fuel cell system, a water vapor transfer (WVT) device may be employed to humidify the air stream entering the fuel cell stack. The WVT device transfers water vapor from an exhaust stream from the fuel cell stack to a feed stream entering the fuel cell stack. This is generally accomplished by using a water vapor transfer membrane which allows only water vapor to pass therethrough. This membrane is typically permanently attached to a diffusion media layer, called a separator, which controls gas flow.

An exemplary WVT device for a fuel cell system is disclosed in U.S. Pat. Appl. Pub. No. 2009/0092863 to Skala, the entire disclosure of which is hereby incorporated herein by reference. Skala describes a plate for a WVT device having a top layer formed from a diffusion medium and a bottom layer formed from a diffusion medium. An array of substantially planar elongate ribbons is disposed between the top and bottom diffusion medium layers to form the individual plate of the WVT device. A membrane is adhered to at least one of the top and bottom diffusion medium layers.

As part of a fuel cell system, the WVT device can be used to humidify an air stream entering the fuel cell stack. It is known to assemble the WVT device within a housing, and to incorporate the WVT assembly into a fuel cell module such as a lower end unit (LEU) of the fuel cell system. The WVT has both dry streams and wet streams passing through it. The dry stream is the air stream to a cathode inlet of the fuel cell system, and is generally pulled from the atmosphere via a compressor. The dry stream may have minimal RH with an oxygen content of approximately twenty-one percent (21%). The wet stream generally comes from a cathode outlet of the fuel cell stack, is highly humidified, and contains little to no oxygen. The exact RH and oxygen content is dependent on the operating conditions of the fuel cell stack. The pressure of the dry stream is typically higher than the wet stream, with the exact pressures depending on the pressure drop through module flow channels of the fuel cell system, and across the fuel cell stack for a given operating condition.

The dry stream and wet stream are kept separate using the membrane of the WVT device, which allows water vapor to pass from the wet stream to the dry stream without allowing gases such as oxygen through (i.e. the dry air flow is humidified but the oxygen content is not depleted). In order for the WVT device to function efficiently, both the wet stream and the dry stream must be sealed to their mating components within the fuel cell module. A dry stream leak results in loss of oxygen reactant delivered to the fuel cell stack, and requires additional air input by the compressor which reduces efficiency of the fuel cell system. A wet stream leak results in humidified air bypassing the WVT device, and either being dumped overboard or to exhaust. The wet stream leak results in less water vapor available for transfer to the dry stream.

Known designs have attempted to provide a substantially fluid tight seal for both the dry stream and the wet stream using elastomeric seals. In most cases, the sealing planes of the wet and dry streams have been perpendicular to each other. This has created issues such as the need to maintain tight tolerances between WVT assembly and the mating components of the fuel cell module in order to maintain targeted seal compression. Installation of the WVT assembly into the fuel cell module is also known to be difficult due to seals rubbing during installation. While it has also been possible to vary compression of the elastomeric seals to obtain sufficient sealing in two of the four sealing planes of the WVT assembly, it has been difficult to vary compression in the other two sealing planes of the WVT assembly.

There is a continuing need for a WVT assembly that simplifies installation into a fuel cell module, eliminates a use of compression sealing in desired sealing planes of the WVT assembly, and minimizes pressure differential across end plates of the WVT assembly. Desirably, the WVT assembly requires less structure and has a reduced part count in comparison to conventional assemblies, and allows for larger tolerances for the assembly interface with the fuel cell module.

SUMMARY OF THE INVENTION

In concordance with the instant disclosure, a WVT assembly that simplifies installation into a fuel cell module, eliminates a use of compression sealing in desired sealing planes of the WVT assembly, minimizes pressure differential across end plates of the WVT assembly, requires less structure and has a reduced part count in comparison to conventional assemblies, and allows for larger tolerances for the assembly interface with the fuel cell module, is surprisingly discovered.

The present disclosure utilizes a sealing concept where an airtight seal is not required for the wet stream. The amount of the wet stream bypassing the WVT device is minimized using a tortuous bypass path formed by including features at an interface of the WVT device and the housing, which leads to increased pressure drop for the wet stream flowing along the bypass path at the interface. The tortuous bypass path can be designed as a minimal clearance feature, or may include near-zero clearance features to assist in creating pressure drop. The near-zero clearance features may result from the use of end plates with flexible ribs or brush-like features. In addition, the use of part geometry is enhanced by including a skewing feature to bias the final WVT position during the installation process, thus further increasing the pressure drop. The skewing of the WVT device during installation can be accomplished using a spring element to bias the WVT device within the housing. An alternative approach includes the use of at least one of geometry, gravity, and air pressure to create a like skewing effect.

In one embodiment, a water vapor transfer assembly includes at least one water vapor transfer device having a plurality of wet plates configured to receive a wet stream, and a plurality of dry plates configured to receive a dry stream. The wet plates and the dry plates alternate in a stack and are separated from one another by water transfer membranes. The water vapor transfer device permits a transfer of water from the wet stream to the dry stream. The water vapor transfer device is disposed between a pair of end plates. The end plates each have a plurality of outwardly extending ribs. The water vapor transfer device and the end plates are disposed within a housing. The housing has a pair of wet stream apertures and a pair of dry stream apertures formed therein. The wet stream apertures are in communication with the wet plates of the water vapor transfer device. The dry stream apertures are in communication with the dry plates of the water vapor transfer device. The housing further includes a plurality of channels formed adjacent the dry stream apertures. The channels are in fluid communication with the wet stream apertures. The outwardly extending ribs of the end plates cooperate with the channels to define a tortuous bypass flow path between the wet stream apertures of the housing.

In another embodiment, the water vapor transfer assembly further includes a pair of elastomeric seals. One of the elastomeric seals is disposed in each of the dry stream apertures of the housing. The elastomer seals abut the end plates and the water vapor transfer device, and militate against a leakage of the dry stream into the wet stream. The end plates also include at least one spring element configured to bias the ribs of the end-plates to one side of the channels formed in the housing. A clearance between the ribs and the channels is minimized, and a pressure differential across the tortuous bypass flow path is maximized relative to a pressure differential across the water vapor transfer device, to thereby urge the wet stream to flow through the water vapor transfer device.

In a further embodiment, the ribs and the channels have corresponding dovetail shapes that permit each of the ribs to rest upon a surface of each of the channels.

DRAWINGS

The above, as well as other advantages of the present disclosure, will become readily apparent to those skilled in the art from the following detailed description, particularly when considered in the light of the drawings described herein.

Figure 1:
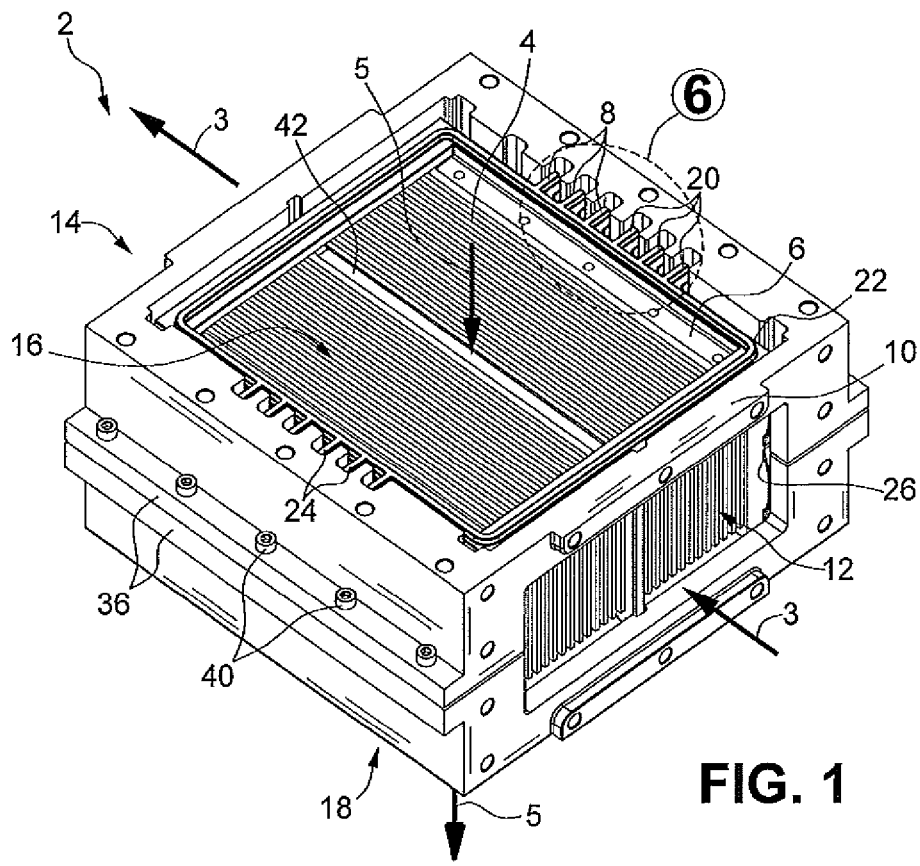
FIG. 1 is a perspective view of a water vapor transfer assembly according to one embodiment of the present disclosure, showing a water vapor transfer device disposed within a housing, and a flow direction of a wet stream and a dry stream through the water vapor transfer device.
Figure 6:
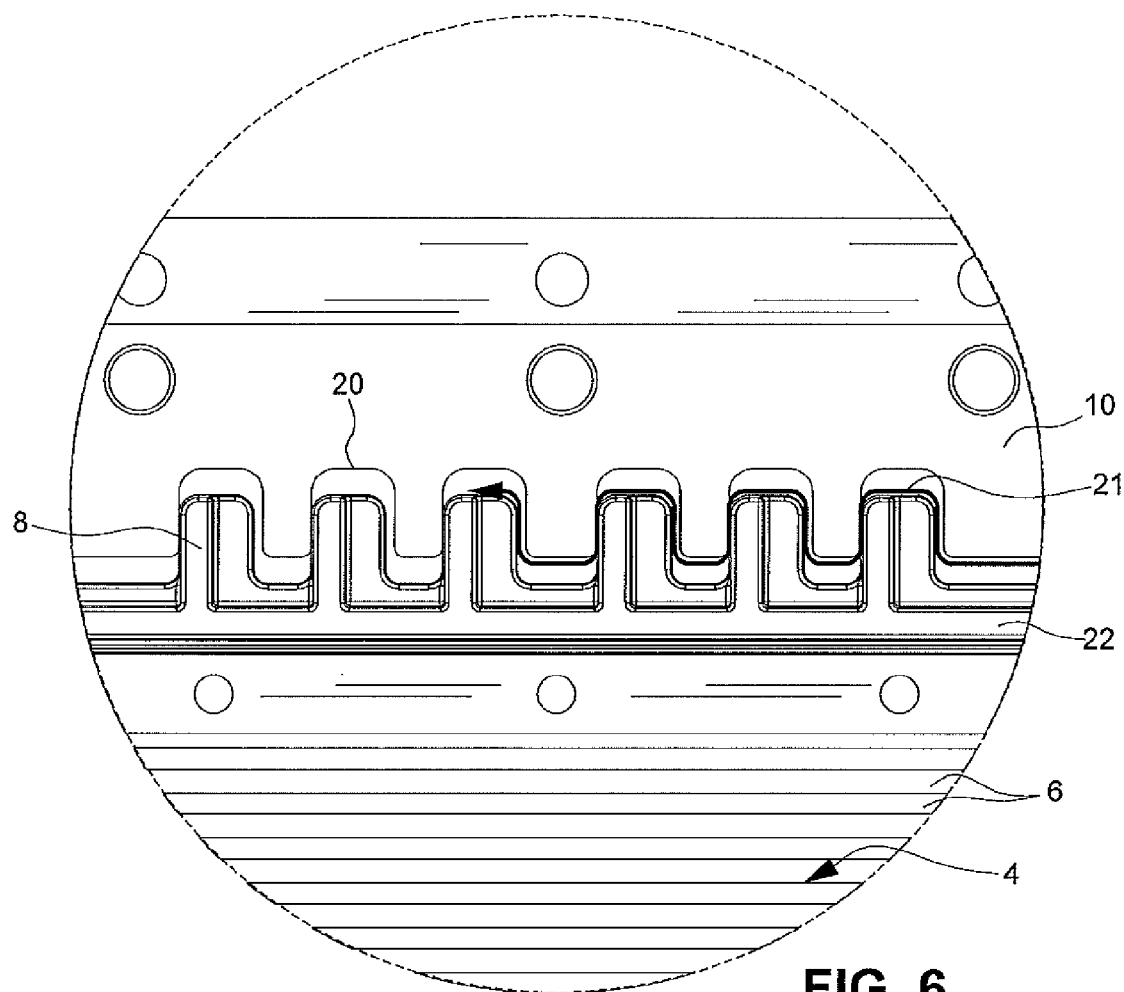
Figure 7:
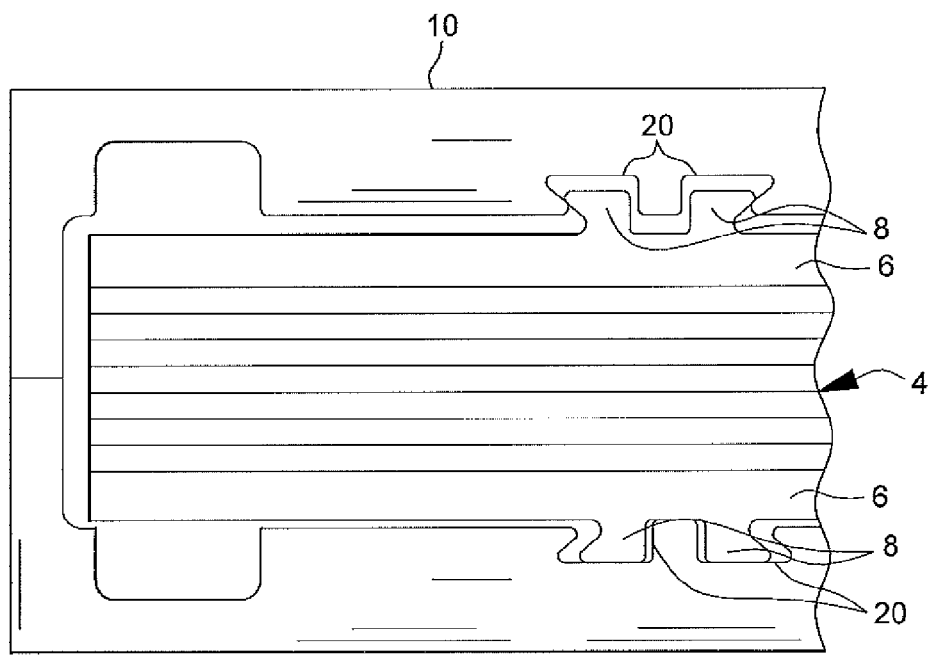

FIG. 6 is an enlarged fragmentary side elevational view showing a plurality of ribs on an end plate of the water vapor transfer assembly illustrated in FIG. 1 and indicated by circle 6, the plurality of ribs cooperating with a plurality of channels formed on the housing; and FIG. 7 is a schematic fragmentary side elevational view of a water vapor transfer assembly according to another embodiment of the disclosure, showing a plurality of ribs on an end plate cooperating with a plurality of channels formed in a housing of the water vapor transfer assembly.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 2:
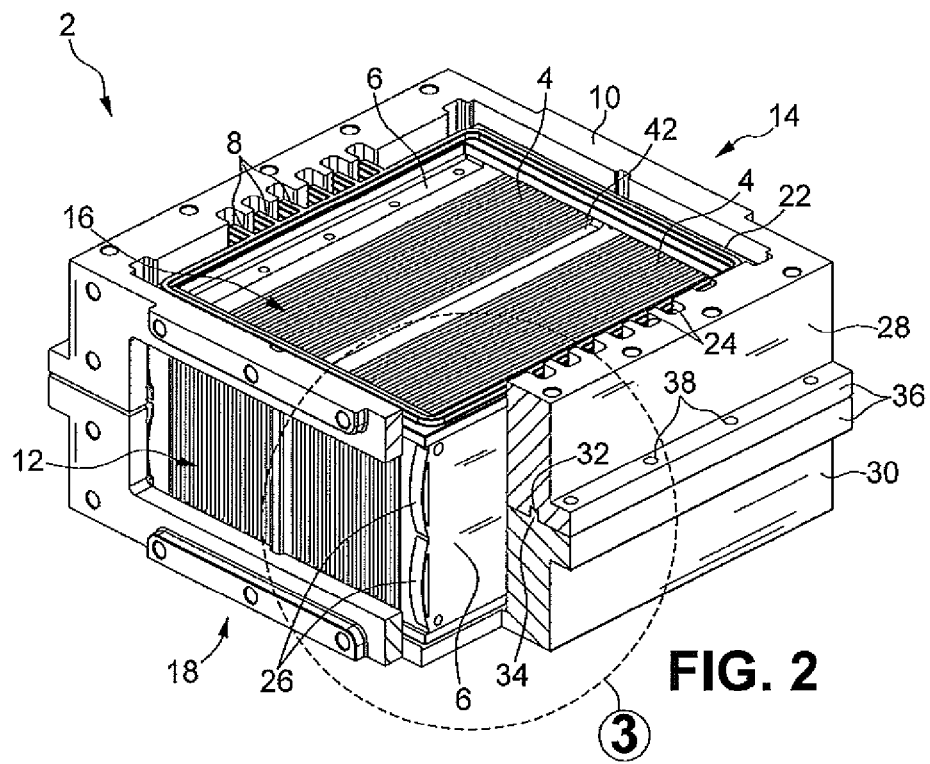
FIG. 2 is a perspective view of the water vapor transfer assembly illustrated in FIG. 1, with a portion of the housing shown removed, and showing the bolt holes for connecting the first and second sections of the housing with a plurality of bolts.
Figure 3:
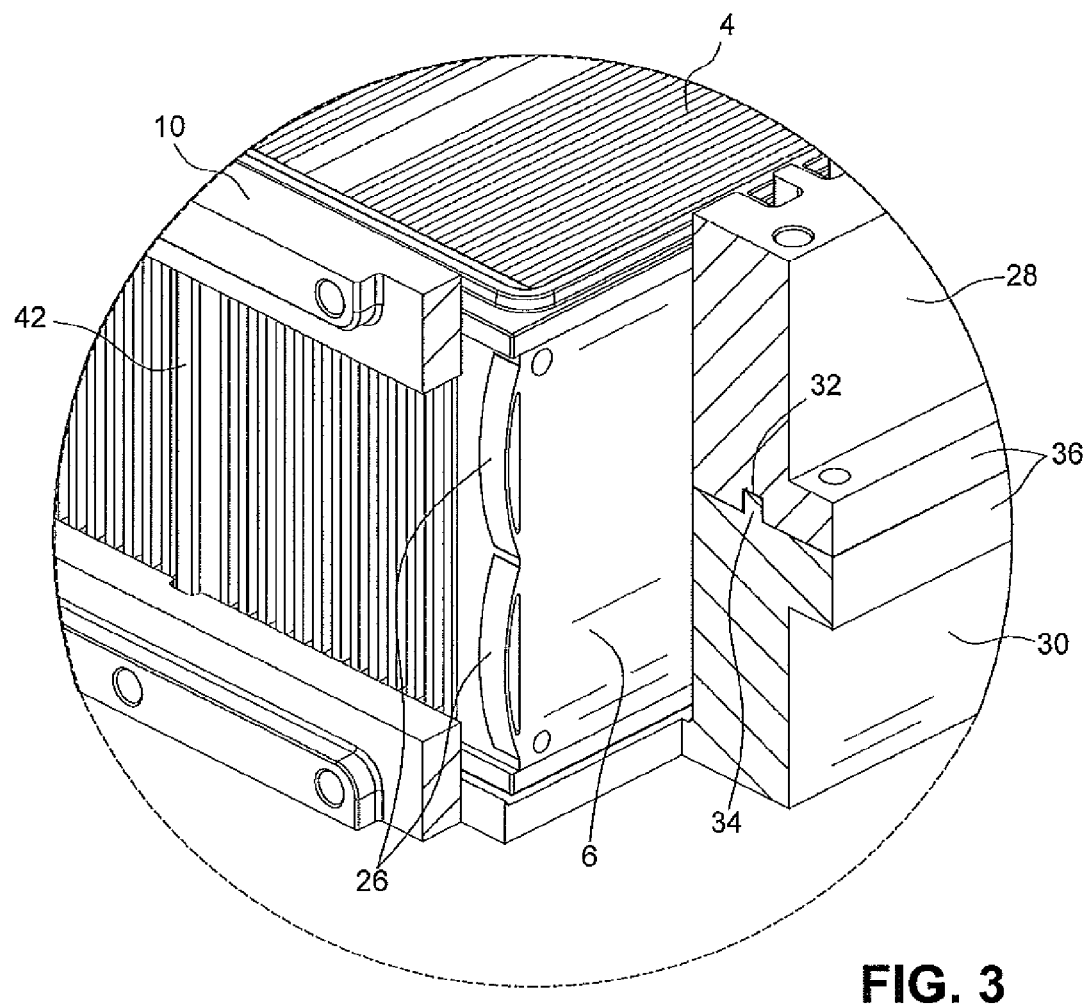
FIG. 3 is an enlarged fragmentary perspective view of the water vapor transfer assembly illustrated in FIG. 2 and indicated by circle 3.

As shown in FIGS. 1-3, a water vapor transfer assembly 2 includes at least one water vapor transfer device 4. The water vapor transfer device 4 may have a plurality of wet plates configured to receive a wet stream 3, and a plurality of dry plates configured to receive a dry stream 5. The wet plates and the dry plates alternate in a stack and are separated from one another by water transfer membranes. The water vapor transfer device permits a transfer of water from the wet stream 3 to the dry stream 5. An exemplary water vapor transfer device is described in U.S. Pat. Appl. Pub. No. 2009/0092863 to Skala, the entire disclosure of which is hereby incorporated herein by reference. One of ordinary skill in the art should appreciate that other configurations and types of water vapor transfer devices 4 may also be used within the scope of the present disclosure.

Figure 4:
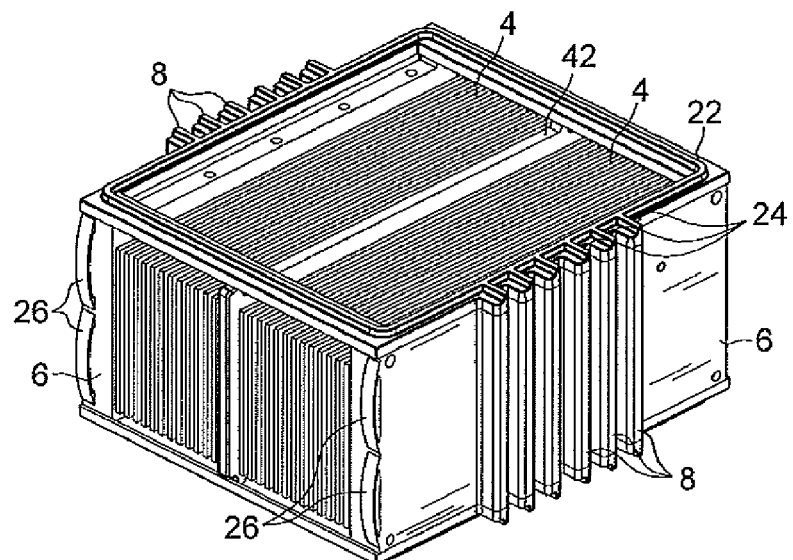
FIG. 4 is a perspective view of the water vapor assembly illustrated in FIG. 2, with an entirety of the housing removed.

The water vapor transfer assembly 2 includes a pair of end plates 6, for example, as best illustrated in FIG. 4. The water vapor transfer device 4 is disposed between the end plates 6. Each of the end plates has a plurality of outwardly extending ribs 8. The water vapor transfer device 4 and the end plates 6 are disposed within a housing 10. The housing 10 may be either a single, one-piece housing 10, or a multi-piece housing 10, as desired.

The housing 10 has a pair of wet stream apertures 12, 14 and a pair of dry stream apertures 16, 18 formed therein. For example, the wet stream aperture 12 may be an inlet for the wet stream 3 having a water vapor content. The wet stream aperture 14 may be an outlet for the wet stream 3 having the water vapor content. The wet stream apertures 12, 14 are in communication with the wet plates of the water vapor transfer device 4. The dry stream apertures 16, 18 are in communication with the dry plates of the water vapor transfer device 4. For example, the dry stream aperture 16 may be an inlet for the dry stream 5 such as atmospheric air. The dry stream aperture 18 may be an outlet for the dry stream 5.

The inlet and outlet dry stream apertures 16, 18 are disposed on opposing sides of the housing 10. The wet stream apertures 12, 14 are likewise disposed on opposing ends of the housing 10. In a particular embodiment, the dry stream apertures 16, 18 and the wet stream apertures 12, 14 permit a flow of the dry stream 5 through the water vapor transfer device 4 that is substantially transverse with respect to a flow and the wet stream 3 through the water vapor transfer device 4. Other directions for the flows of the wet stream 3 and the dry stream 5 may also be employed within the scope of the present disclosure.

The housing 10 further includes a plurality of channels 20 formed adjacent the dry stream apertures 16, 18 of the housing 10. The channels 20 are in fluid communication with the wet stream apertures 12, 14. The outwardly extending ribs 8 of the end plates 6 cooperate with the channels 20 to define a tortuous bypass flow path 21 (illustrated in FIG. 6) between the wet stream apertures 12, 14 of the housing 10. In an alternative embodiment, the tortuous bypass flow path 21 may be disposed between the dry stream apertures 16, 18 instead of the between the wet stream apertures 12, 14, or in addition to between the wet stream apertures 12, 14, as desired.

The water vapor transfer assembly 2 may further include a pair of elastomeric seals 22. In a particular embodiment, one of the elastomeric seals 22 is disposed in each of the dry stream apertures 16, 18 of the housing 10. The elastomeric seals 22 abut the end plates 6 and the water vapor transfer device 4. The elastomeric seals 22 also abut an adjacent mating component (not shown) of a fuel cell module that delivers the dry stream 5 to the water vapor transfer device 4. A substantially fluid-tight seal is formed with the elastomeric seals that militates against a leakage of the dry stream 5 into the wet stream 3 during operation of the water vapor transfer assembly 2.

The elastomeric seals 22 may include a plurality of fins 24 as shown in FIG. 4. The fins 24 may have a shape that is substantially the same as a shape of the ribs 8 formed on the end plates 6. For example, the fins 24 may have the same shape as a cross-section of the ribs 8, and are placed on ends of the ribs 8. In a particular embodiment, the fins 24 of the elastomeric seals 22 abut the ends of the ribs 8 of the end plates 6. In cooperation with the adjacent mating component for delivery of the dry stream 5, the elastomeric seals 22 and the fins 24 militate against a leakage of the dry stream 5 into the tortuous bypass flow path 21 of the wet stream 3, which runs between the wet stream apertures 12, 14 of the housing 10.

A portion of the wet stream 3 is caused by the tortuosity of the bypass flow path 21 to flow through the water vapor transfer device 4 rather than through the tortuous bypass flow path. As a nonlimiting example, approximately one percent (1%) to four percent (4%) of the wet stream 3 may be permitted to bypass the water vapor transfer device 4 while in operation. It has been surprisingly found that such a bypass of the water vapor transfer device 4 only results in a reduction of water transfer rate to the dry stream 5 of only about one-tenth of a percent (0.1%) to about one-half of a percent (0.5%), while permitting some equilibration of pressure between operating conditions of the water vapor transfer device 4, and the atmospheric conditions exterior to the water vapor transfer device 4.

In certain embodiments, a clearance or gap between the ribs 8 and walls of the channels 20 may be minimized to maximize a pressure differential across the tortuous bypass flow path. In particular, the pressure differential across the tortuous bypass flow path 21 may be maximized relative to a pressure differential across the water vapor transfer device 4. It should be appreciated that maximization of the pressure differential across the tortuous bypass flow path 21 further urges the wet stream 3 to flow through the water vapor transfer device 4 of the water vapor transfer assembly 2.

The ribs 8 and the channels 20 may be arranged relative to one another so that there is substantially no clearance between the ribs 8 and the channels 20. For example, the ribs 8 may be biased to one side of the channels 20 upon installation of the end plates 6 in the water vapor transfer assembly 2. As illustrated in FIG. 3, the end plates 6 may include at least one spring element 26 configured to bias the ribs 8 of the end plates 6 to the one side of the channels 20 formed in the housing 10.

Although there may be substantially no clearance between the ribs 8 and the walls of the channels 20 due to the biasing, it should be appreciated that the pressure of the wet stream 3 may be sufficient to cause at least a minimal portion of the wet stream 3 to flow through the interface of the ribs 8 and the walls of the channels 20.

The at least one spring element 26 may abut an inner portion of the housing 10, for example, to cause the biasing. It should be understood that, in order to accomplish a biasing of the ribs 8 in one direction, the at least one spring element 26 is disposed at a same end of the each of the end plates 6, and adjacent a same side of the water vapor transfer device 4. The at least one spring element 26 may be integral with each of the end plates 6, or provided as a separate spring element 26 disposed between the end plate 6 and the inner portion of the housing 10. In the particular embodiment shown in FIGS. 2 to 4, the at least one spring element 26 is a leaf spring. One of ordinary skill in the art may select other types of springs for the at least one spring element 26, as desired.

Figure 5:
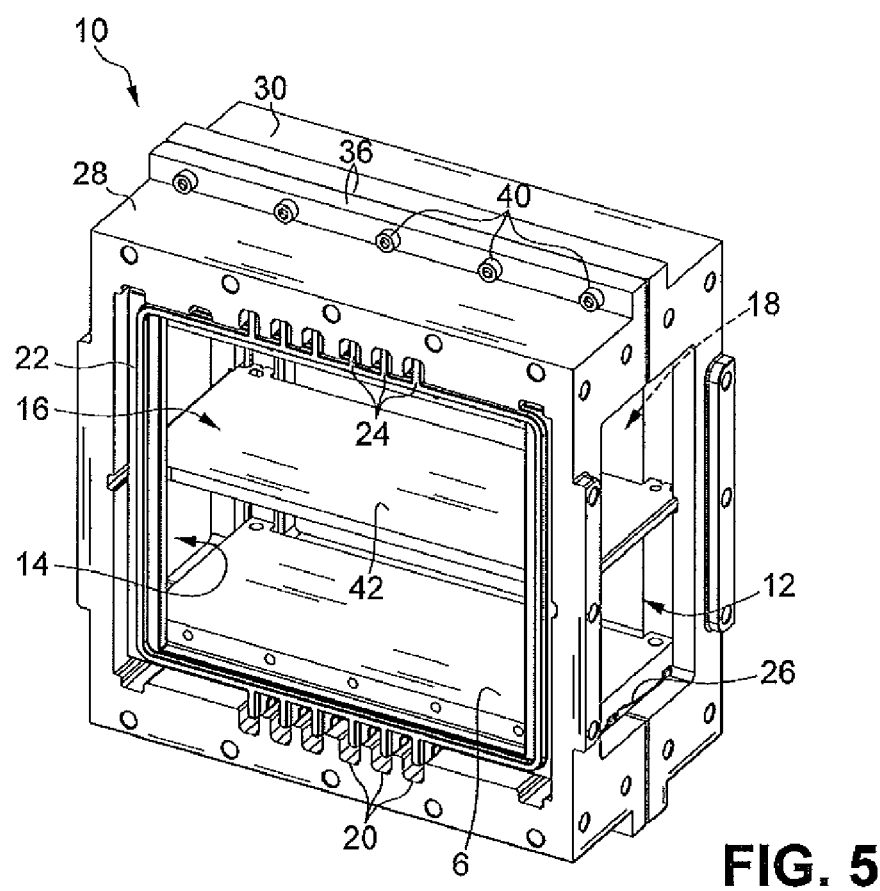
FIG. 5 is a perspective view of the water vapor assembly illustrated in FIG. 1, with an entirety of the water vapor transfer device removed.

As illustrated in FIG. 5, the housing 10 may include a first housing section 28 connected with a second housing section 30. The first housing section 28 may include one of the dry stream apertures 16, and the second housing section 30 may have the other of the dry stream apertures 18. The wet stream apertures 12, 14 may be formed by the connection of the first housing section 28 and the second housing section 30, for example.

With renewed reference to FIGS. 2 and 3, the first housing section 28 may include a slot 32 and the second housing section 30 may include a corresponding tab 34. The tab 34 cooperates with the slot 32 to align and seal the first housing section 28 and the second housing section 30 when the same are connected. The tab 34 may friction fit with the slot 32, or may alternatively include an elastomeric coating to contribute to a substantially fluid tight seal of the first housing section 28 with the second housing section 30.

Each of the first housing section 28 and the second housing section 30 may have an outwardly extending shoulder 36 with a plurality of holes 38 formed therethrough. The holes 38 may have internal threading, for example, to cooperate with an external threading of threaded bolts 40. The first housing section 28 and the second housing section 30 may be connected by the threaded bolts 40 disposed through the holes 38 in the outwardly extending shoulders 36 of the first housing section 28 and the second housing section 30, to seal and form the housing 10 of the water vapor transfer assembly 2. Other means for connecting the first housing section 28 and the second housing section 30 may also be employed within the scope of the present disclosure.

It should be understood that the at least one water vapor transfer device 4 may include a multitude of water vapor transfer devices 4. In the embodiment shown in FIGS. 1, 2 and 4, the at least one water vapor transfer device 4 includes a first water vapor transfer device 4 and a second water vapor transfer device 4. The first and second water vapor transfer devices 4 may be substantially the same or of different construction, as desired. The first water vapor transfer device 4 may be separated from the second water vapor transfer device 4 within the housing 10 by a separator plate 42. The separator plate 42 also provides additional stability and location to the housing 10.

A skilled artisan may select a shape for the ribs 8 of the end plates 6, as desired. The shape of the ribs 8 may be substantially rectangular in cross-section, for example. In particular examples, the shape of the ribs 8 may be selected to facilitate the minimization of the clearance between the ribs 8 and the walls of the channels 20 in which the ribs 8 are disposed. The shape of the ribs 8 may utilize at least one of the force of gravity and a biasing force of air pressure to cause the shaped ribs 8 to contact or nearly contact the walls of the channels 20. As a nonlimiting example, the ribs 8 and the channels 20 may have corresponding dovetail shapes that permit each of the ribs 8 to rest upon a surface of each of the channels 20. It should be appreciated that the minimization of the clearance between the ribs 8 and the walls of the channels 20 may thereby result. Likewise, the wet stream 3 is caused to instead travel through the water vapor transfer device 4, regardless of the absence of an elastomeric seal at the wet stream apertures 12, 14.

Advantageously, the water vapor transfer assembly 2 of the present disclosure simplifies installation of the water vapor transfer device 4 into a fuel cell module. It should be appreciated that the water vapor transfer assembly 2 eliminates a use of compression sealing at the sealing planes associated with the wet stream apertures 12, 14 of the housing 10, and instead relies upon at least one of the tortuosity of the bypass flow path 21 and the biasing caused by the end plates 6 to cause the wet stream 3 to travel through he water vapor transfer device 4. The pressure differential across the water vapor transfer assembly 2 is also minimized due to at least one of the tortuous configuration of the wet stream bypass flow and the biasing of the ribs 8 of the end plates 6. The water vapor transfer assembly 2 also requires less structure and has a reduced part count than conventional assemblies having four elastomeric seals, i.e., one elastomeric seal for each inlet and outlet for the wet and dry streams 3, 5. As elastomeric seals are not employed at the wet stream apertures 12, 14 of the housing 10, greater tolerances for the interface with the mating components of the fuel cell module may be advantageously employed.

While certain representative embodiments and details have been shown for purposes of illustrating the invention, it will be apparent to those skilled in the art that various changes may be made without departing from the scope of the disclosure, which is further described in the following appended claims.

What is claimed is:

1. A water vapor transfer assembly comprising:
   at least one water vapor transfer device having a plurality of wet plates configured to receive a wet stream and a plurality of dry plates configured to receive a dry stream, the wet plates and the dry plates alternating in a stack and separated from one another by water transfer membranes, the at least one water vapor transfer device permitting a transfer of water from the wet stream to the dry stream;
   a pair of end plates between which the at least one water vapor transfer device is disposed, the end plates each having a plurality of outwardly extending ribs; and
   a housing having a pair of wet stream apertures and a pair of dry stream apertures formed therein, the at least one water vapor transfer device and the end plates disposed within the housing, the wet stream apertures in communication with the wet plates of the at least one water vapor transfer device and the dry stream apertures in communication with the dry plates of the at least one water vapor transfer device, the housing further including a plurality of channels formed adjacent the dry stream apertures and in fluid communication with the wet stream apertures, the outwardly extending ribs of the end plates cooperating with the channels to define a tortuous bypass flow path between the wet stream apertures of the housing.

2. The water vapor transfer assembly of claim 1, further comprising a pair of elastomeric seals, one of the elastomeric seals disposed in each of the dry stream apertures of the housing, the elastomer seals abutting the end plates and the at least one water vapor transfer device and militating against a leakage of the dry stream into the wet stream.

3. The water vapor transfer assembly of claim 2, wherein the elastomeric seals include fins having substantially a same shape as a cross-sectional shape of the ribs.

4. The water vapor transfer assembly of claim 3, wherein the fins of the elastomeric seals abut the ribs of the end plates.

5. The water vapor transfer assembly of claim 1, wherein a clearance between the ribs and the channels is minimized, and a pressure differential across the tortuous bypass flow path is maximized, to thereby urge the wet stream to flow through the at least one water vapor transfer device.

6. The water vapor transfer assembly of claim 5, wherein there is substantially no clearance between the ribs and the channels.

7. The water vapor transfer assembly of claim 5, wherein the end plates include at least one spring element configured to bias the ribs of the end plates to one side of the channels formed in the housing.

8. The water vapor transfer assembly of claim 7, wherein the at least one spring element abuts an inner portion of the housing.

9. The water vapor transfer assembly of claim 7, wherein the at least one spring element is disposed at an end of the each of the end plates.

10. The water vapor transfer assembly of claim 9, wherein the ends of each of the end plates at which the spring elements are disposed are adjacent a same side of the water vapor transfer device.

11. The water vapor transfer assembly of claim 9, wherein the at least one spring element is integral with each of the end plates.

12. The water vapor transfer assembly of claim 11, wherein the at least one spring element is a leaf spring.

13. The water vapor transfer assembly of claim 5, wherein the ribs and the channels have corresponding dovetail shapes that permit each of the ribs to rest upon a surface of each of the channels.

14. The water vapor transfer assembly of claim 1, wherein the housing includes a first housing section connected with a second housing section, the first housing section having one of the dry stream apertures and the second housing section having an other of the dry stream apertures, the wet stream apertures formed by the connection of the first housing section and the second housing section.

15. The water vapor transfer assembly of claim 14, wherein the first housing section includes a slot and the second housing section includes a tab, the tab cooperating with the slot to align and seal the first housing section and the second housing section.

16. The water vapor transfer assembly of claim 15, wherein each of the first housing section and the second housing section has an outwardly extending shoulder with a plurality of holes formed therethrough, the first housing section and the second housing section connected by bolts disposed through the holes in the outwardly extending shoulders thereof to form the housing of the water vapor transfer assembly.

17. The water vapor transfer assembly of claim 1, wherein the dry apertures are disposed on opposing sides of the housing, and the wet apertures are disposed on opposing ends of the housing, the dry apertures and the wet apertures permitting a flow of the dry stream through the at least one water vapor transfer device that is transverse with respect to a flow and the wet stream.

18. The water vapor transfer assembly of claim 1, wherein the at least one water vapor transfer device includes a first water vapor transfer device and a second water vapor transfer device, the first water vapor transfer device and the second water vapor transfer device separated by a separator plate disposed within the housing.

19. A water vapor transfer assembly comprising:
at least one water vapor transfer device having a plurality of wet plates configured to receive a wet stream and a plurality of dry plates configured to receive a dry stream, the wet plates and the dry plates alternating in a stack and separated from one another by water transfer membranes, the at least one water vapor transfer device permitting a transfer of water from the wet stream to the dry stream;
a pair of end plates between which the at least one water vapor transfer device is disposed, the end plates each having a plurality of outwardly extending ribs;
a housing having a pair of wet stream apertures and a pair of dry stream apertures formed therein, the at least one water vapor transfer device and the end plates disposed within the housing, the wet stream apertures in communication with the wet plates of the at least one water vapor transfer device and the dry stream apertures in communication with the dry plates of the at least one water vapor transfer device, the housing further including a plurality of channels formed adjacent the dry stream apertures and in fluid communication with the wet stream apertures, the outwardly extending ribs of the end plates cooperating with the channels to define a tortuous bypass flow path between the wet stream apertures of the housing; and
a pair of elastomeric seals, one of the elastomeric seals disposed in each of the dry stream apertures of the housing, the elastomer seals abutting the end plates and the at least one water vapor transfer device and militating against a leakage of the dry stream into the wet stream,
wherein the end plates include at least one spring element configured to bias the ribs of the end plates to one side of the channels formed in the housing, and wherein a clearance between the ribs and the channels is minimized, and a pressure differential across the tortuous bypass flow path is maximized, to thereby urge the wet stream to flow through the at least one water vapor transfer device.

20. A water vapor transfer assembly comprising:
at least one water vapor transfer device having a plurality of wet plates configured to receive a wet stream and a plurality of dry plates configured to receive a dry stream, the wet plates and the dry plates alternating in a stack and separated from one another by water transfer membranes, the at least one water vapor transfer device permitting a transfer of water from the wet stream to the dry stream;
a pair of end plates between which the at least one water vapor transfer device is disposed, the end plates each having a plurality of outwardly extending ribs; and
a housing having a pair of wet stream apertures and a pair of dry stream apertures formed therein, the at least one water vapor transfer device and the end plates disposed within the housing, the wet stream apertures in communication with the wet plates of the at least one water vapor transfer device and the dry stream apertures in communication with the dry plates of the at least one water vapor transfer device, the housing further including a plurality of channels formed adjacent the dry stream apertures and in fluid communication with the wet stream apertures, the outwardly extending ribs of the end plates cooperating with the channels to define a tortuous bypass flow path between the wet stream apertures of the housing,
wherein the ribs and the channels have corresponding dovetail shapes that permit each of the ribs to rest upon a surface of each of the channels, and wherein a clearance between the ribs and the channels is minimized, and a pressure differential across the tortuous bypass flow path is maximized, to thereby urge the wet stream to flow through the at least one water vapor transfer device.

* * * * *